(12) United States Patent
Konta (10) Patent No.: US 6,219,558 B1
(45) Date of Patent: Apr. 17, 2001

(54) FACSIMILE COMMUNICATION SYSTEM CAPABLE OF CARRYING OUT POLLING COMMUNICATION WITH NON-POLLING FUNCTION FACSIMILE MACHINE

(75) Inventor: Isamu Konta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/016,276

(22) Filed: Jan. 30, 1998

(30) Foreign Application Priority Data

Jan. 30, 1997 (JP) ................................... 9-016405

(51) Int. Cl.⁷ ....................................... H04B 7/00
(52) U.S. Cl. ......................... 455/509; 455/517; 455/557
(58) Field of Search .................................. 455/422, 426, 455/450, 509, 510, 517, 524, 550, 557, 575, 67.4; 348/425, 435; 370/465, 468

(56) References Cited

U.S. PATENT DOCUMENTS 5,070,536 * 12/1991 Mahany et al. ...................... 455/67.4
5,752,199 * 5/1998 Scott ................................... 455/557
5,805,301 * 9/1998 Rasanen .............................. 455/509

FOREIGN PATENT DOCUMENTS 1-120959  5/1989  (JP).
7-131624  5/1995  (JP).

* cited by examiner

Primary Examiner—Thanh Cong Le
(74) Attorney, Agent, or Firm—Foley & Lardner

(57) ABSTRACT

In a facsimile communication system including a first adapter connected to a first facsimile machine having a polling function and a second adapter connected to a second facsimile machine, wherein, only when the first adapter receives digital identification signals from both of the first and second facsimile machines within a predetermined time period, does the first adapter generate a digital transmit signal and transmit it to the first facsimile machine so that a polling communication is carried out from the first facsimile machine to the second facsimile machine.

8 Claims, 7 Drawing Sheets

FACSIMILE COMMUNICATION SYSTEM CAPABLE OF CARRYING OUT POLLING COMMUNICATION WITH NON-POLLING FUNCTION FACSIMILE MACHINE

BACKGROUND OF THE INVENTION

1. Field of the Invention

The present invention relates to a facsimile communication system, and more particularly, to a polling communication system between a facsimile machine having a polling function and a facsimile machine not having a polling function.

2. Description of the Related Art

Generally, in a facsimile communication system, it is impossible to carry out a polling communication from a facsimile machine having a polling function to a facsimile machine having no polling function. This will be explained later in detail.

If an additional function for determining whether or not a digital identification signal showing the presence of data to be transmitted is received is provided in the facsimile machine having no polling machine, this facsimile machine can receive polling-transmitted data (see JP-A-1-120959 & JP-A-7-131624); however, in this case, the manufacturing cost of the facsimile machine having no polling function is increased.

SUMMARY OF THE INVENTION

It is an object of the present invention to carry out a polling communication with a facsimile machine having no polling function without changing the facsimile machine.

According to the present invention, in a facsimile communication system including a first adapter connected to a first facsimile machine having a polling function and a second adapter connected to a second facsimile machine, wherein, only when the first adapter receives digital identification signals from both of the first and second facsimile machines within a predetermined time period, does the first adapter generate a digital transmit signal and transmit it to the first facsimile machine so that a polling communication is carried out from the first facsimile machine to the second facsimile machine.

A special function is provided in the first adapter without changing the second facsimile machine.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, a prior art facsimile communication system will be explained with reference to FIGS. 1A, 1B, 2 and 3. Note that PA designates a preamble portion.

Figure 1A:
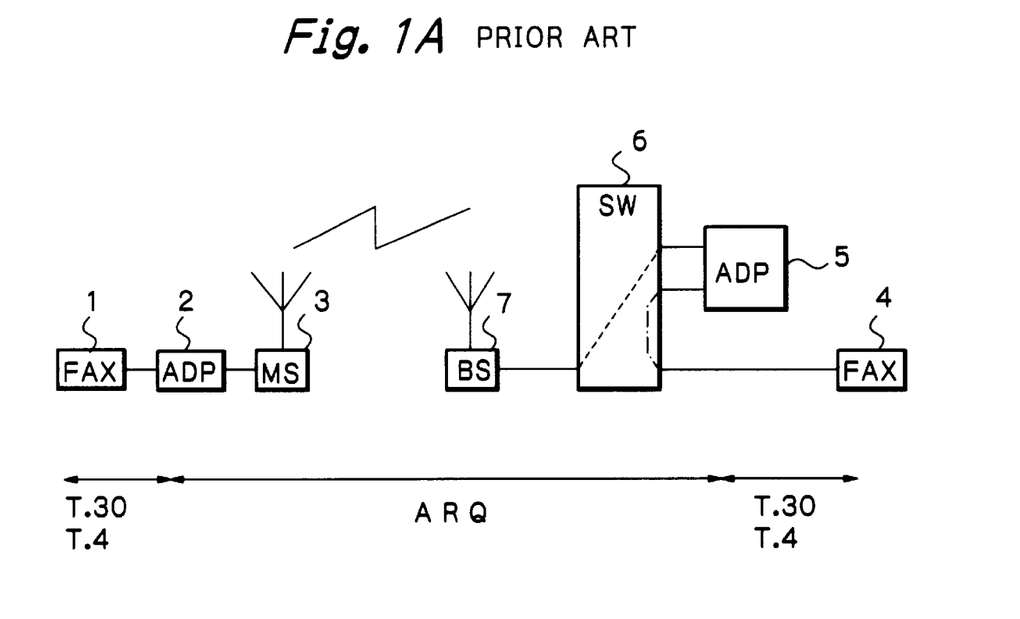
FIG. 1A is a block diagram illustrating a prior art facsimile communication system.
Figure 1B:
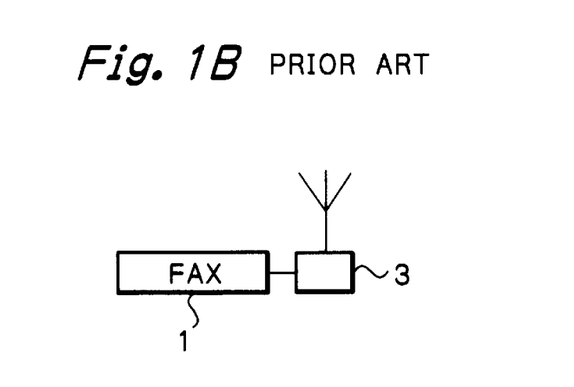
FIG. 1B is a block diagram illustrating a modification of the system of FIG. 1A.

In FIG. 1A, which illustrates a prior art facsimile communication system, reference numeral 1 designates a facsimile machine which is connected by an adapter 2 to a mobile station 3. In this case, as illustrated in FIG. 1B, if the facsimile machine 1 incorporates such an adapter, the facsimile machine 1 is connected directly to the mobile station 3. On the other hand, another facsimile machine 4 is connected to an adapter 5 via a switching system 6. The switching system 6 is also connected to a base station 7 which can communicate with the mobile station 3.

Communication between the facsimile machine 1 and the adapter 2 is carried out by ITU-T T.30 and T.4 protocols, and also, communication between the facsimile machine 4 and 5 is carried out by ITU-T T.30 and T.4 protocols. Further, communication between the adapters 2 and 5 is carried out by an automatic repeat request (ARQ) protocol. Thus, communication between the facsimile machines 1 and 4 is substantially carried out by ITU-T T.30 and T.4 protocols, and the ARQ control between the adapters 2 and 5 looks transparent in view of the facsimile machines 4 and 5.

Figure 2:
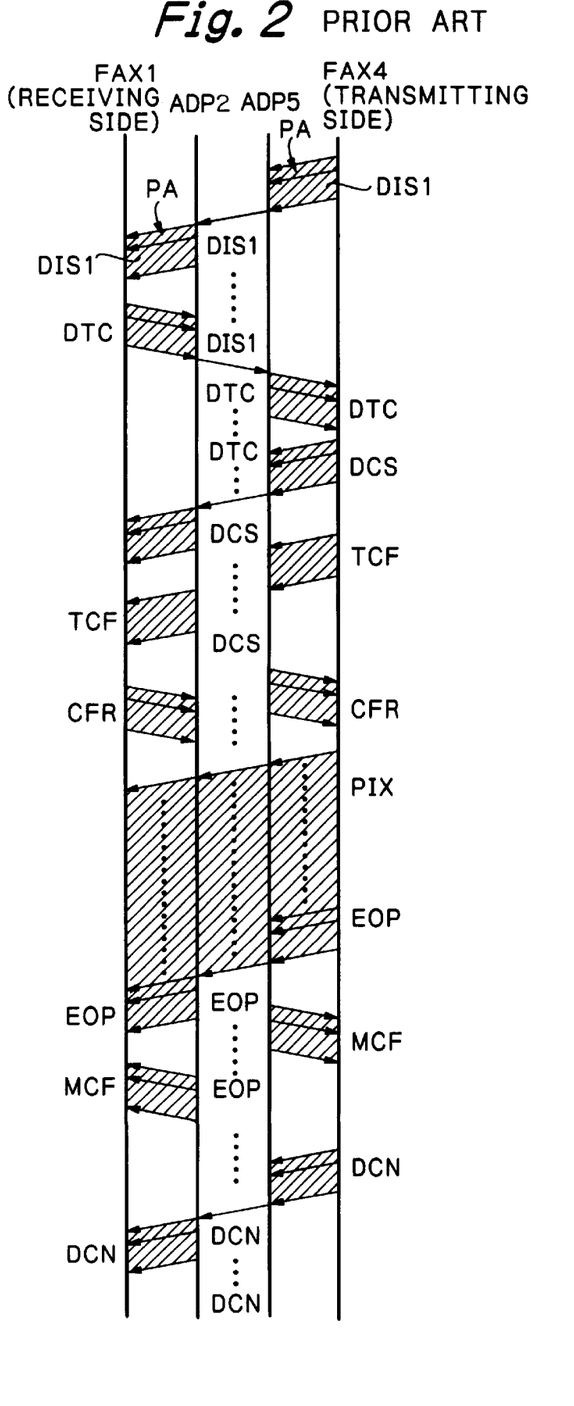
FIGS. 2 and 3 are sequence diagrams showing the operation of the system of FIG. 1A.

A prior art facsimile transmission method will be explained next with reference to a sequence diagram of FIG. 2 where both of the facsimile machines 1 and 4 have polling functions.

After synchronization is realized between the adapters 2 and 5, the facsimile machine 4 generates a digital identification signal (DIS1) showing the presence of data to be transmitted and transmits it to the adapter 5. On the other hand, the adapter 5 transmits the DIS1 successively to the adapter 3 which also transmits the DIS1 successively to the facsimile machine 1.

Note that, if the facsimile machine 4 does not have a polling function, the facsimile machine 4 generates a DIS2 showing the absence of data to be transmitted. Whether a DIS is a DIS1 showing the presence of data to be transmitted or a DIS2 showing the absence of data to be transmitted is determined by the ninth bit of the DIS.

After the facsimile machine 1 has received the DIS1, the facsimile machine 1 generates a digital transmit command (DTC) signal and transmits it to the adapter 2. Immediately thereafter, the adapter 2 transmits the DTC signal successively to the adapter 5 which also transmits the DTC signal successively to the facsimile machine 4.

After the facsimile machine 4 has received the DTC signal, the facsimile machine 4 generates a digital command signal (DCS) and transmits it to the adapter 5. Immediately thereafter, the adapter 5 transmits the DCS successively to the adapter 2 which also transmits the DCS successively to the facsimile machine 1.

Thus, thereafter, a polling transmission from the facsimile machine 4 to the facsimile machine 1 is carried out. In this case, the following signals are sequentially generated:

TCF: Training check signal;
CER: Confirmation to receive signal;
PIX: Pixture signal (Image signal);
EOP: End of procedure signal;
MCF: Message confirmation signal; and
DCN: Disconnect signal.

Figure 3:
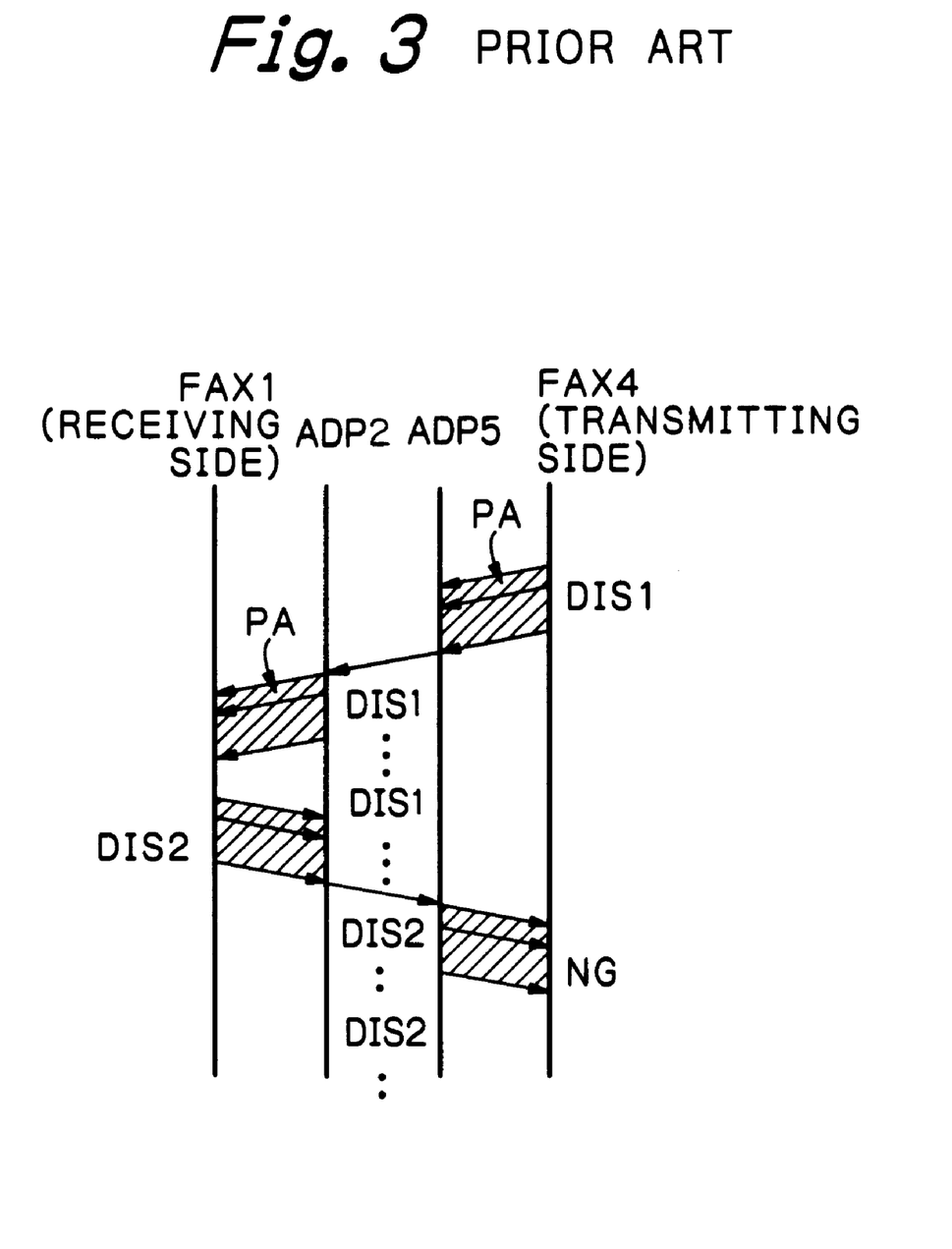

Another prior art facsimile transmission method will be explained next with reference to a sequence diagram of FIG. 3 where the facsimile machine 1 does not have a polling function, while the facsimile machine 4 has polling function.

After synchronization is realized between the adapters 2 and 5, the facsimile machine 4 generates a DIS1 showing the presence of data to be transmitted and transmits it to the adapter 5. On the other hand, the adapter 5 transmits the DIS1 successively to the adapter 2 which also transmits the DISI successively to the facsimile machine 1.

Even after the facsimile machine 1 has received the DIS1, the facsimile machine 1 cannot generate a DTC signal since the facsimile machine 1 does not have a polling function. In this case, the facsimile machine 1 generates a DIS2 showing the absence of data to be transmitted and transmits it to the adapter 2. Immediately thereafter, the adapter 2 transmits the DIS2 successively to the adapter 5 which also transmits the DIS2 successively to the facsimile machine 4.

Thus, the communication enters in a no-good (NG) state, since the facsimile machine 4 received a DIS2.

Therefore, in the prior art facsimile system, if the facsimile machine 1 does not have a polling function, it is impossible for the facsimile machine 1 to receive polling-transmitted data.

Note that, if an additional function for determining whether or not a DIS1 showing the presence of data to be transmitted is received is provided in the facsimile machine 1, the facsimile machine 1 can receive polling-transmitted data (see JP-A-1-120959 & JP-A-7-131624); however, in this case, the manufacturing cost of the facsimile machine 1 is increased.

Figures 4, 4A:
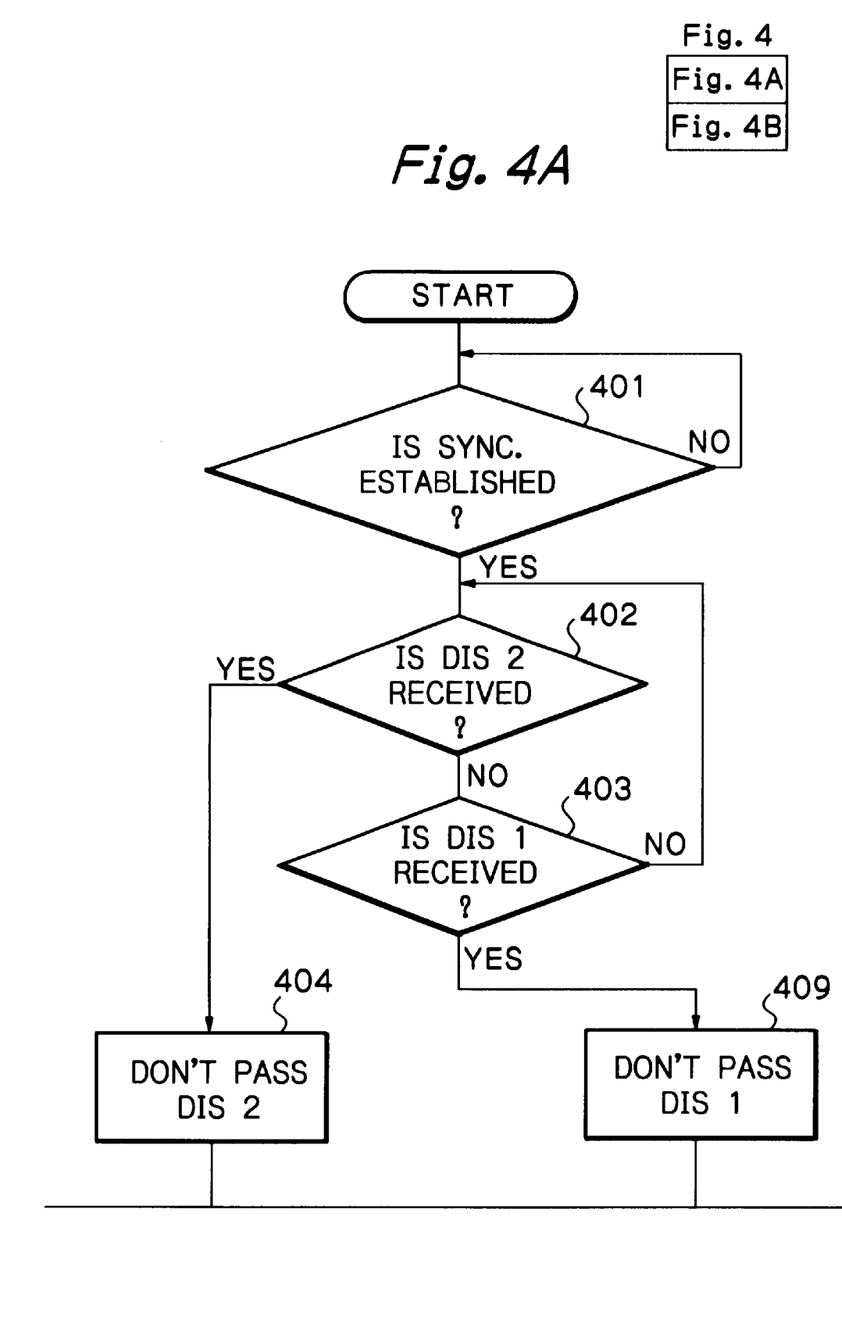
FIGS. 4A and 4B are flowcharts showing an operation of a adapter connected to a polling-functioned facsimile machine according to the present invention.
Figure 4B:
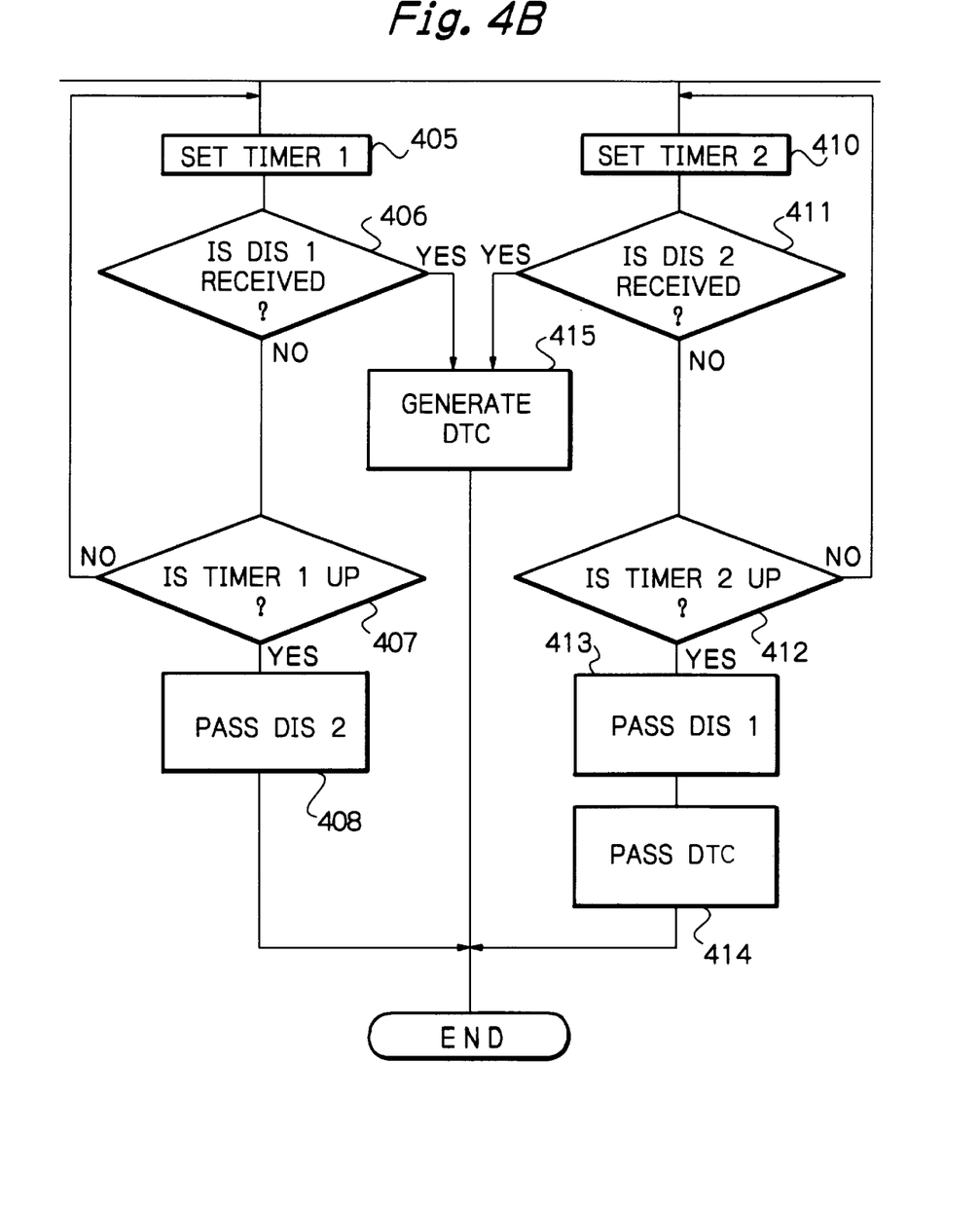

In an embodiment of the present invention, a function as shown in FIG. 4 is introduced into the adapter 5.

Figure 5:
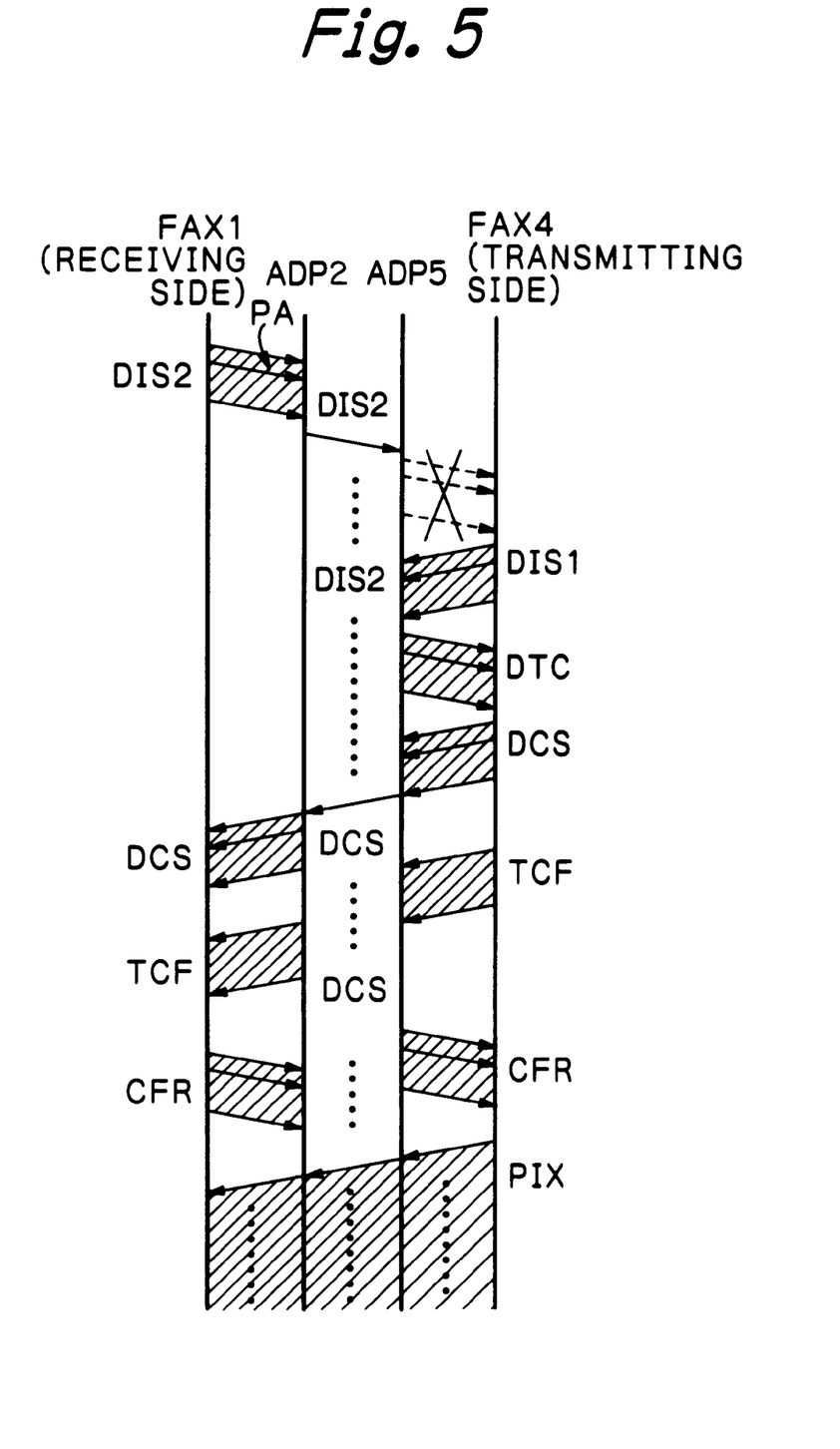
FIGS. 5 and 6 are sequence diagrams for explaining the operation of FIGS. 4A and 4B.
Figure 6:
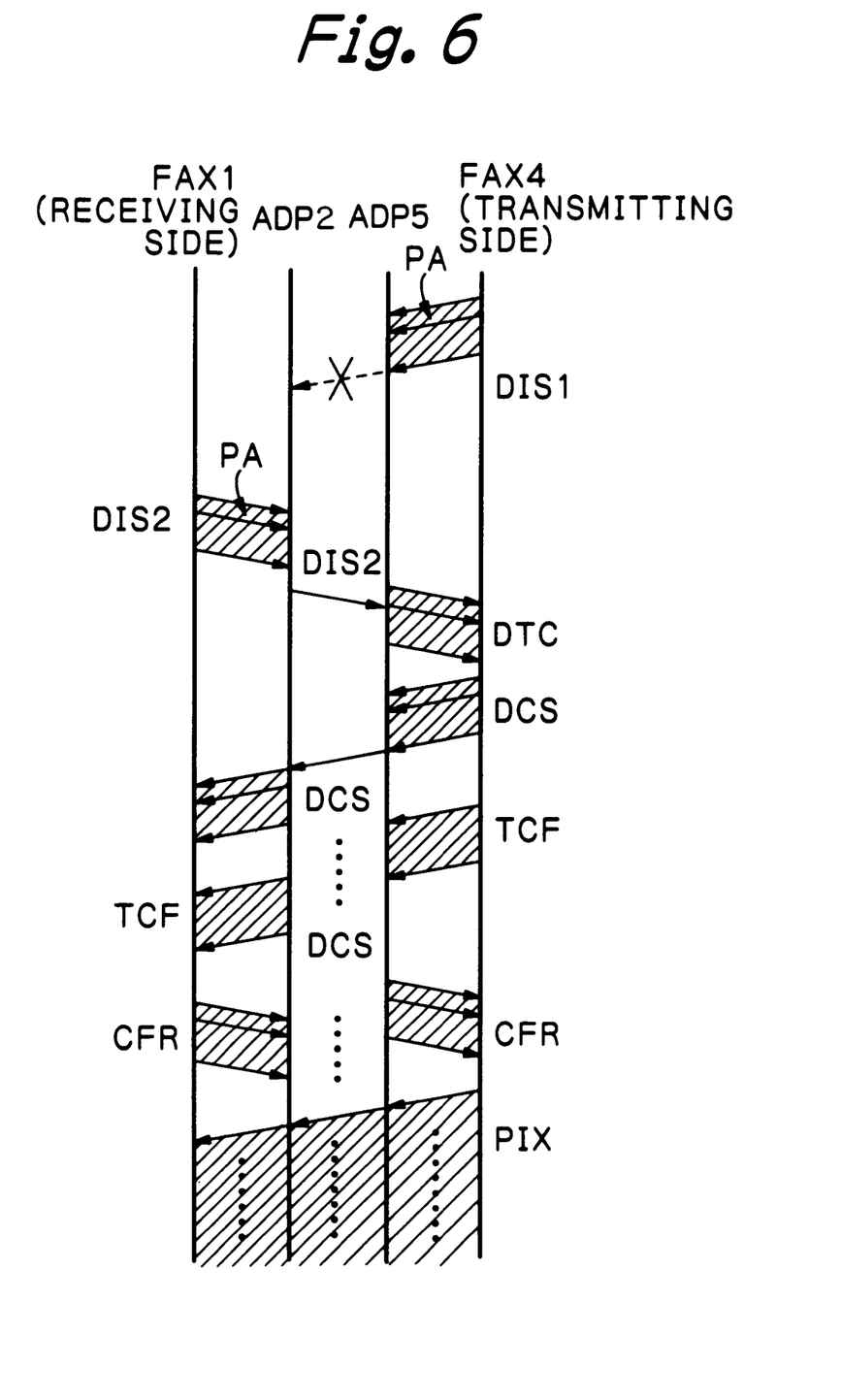

The flowchart of FIG. 4 will be explained next with reference to sequence diagrams of FIGS. 5 and 6.

First, at step 401, the control waits for the adapter 5 to be synchronized with the adapter 2. Only if a synchronization is established between the adapters 2 and 5, does the control proceed to steps 402 and 403.

Next, at step 402, it is determined whether or not the adapter 5 receives a DIS (DIS2) showing the absence of data to be transmitted. In this case, the DIS2 is generated via the adapter 2 from the facsimile machine 1. Also, at step 403, it is determined whether or not the adapter 5 receives a DIS (DIS1) showing the presence of data to be transmitted. In this case, the DIS1 is generated from the facsimile machine 4. As a result, if the adapter 5 receives a DIS2, the control proceeds to step 404, while, if the adapter 5 receives a DIS1, the control proceeds to step 409. Otherwise, the control returns to step 402.

Steps 404 through 408 and 415 are explained next with reference to FIG. 5.

At step 404, the adapter 5 does not pass the DIS2, so that the facsimile machine 4 does not receive any DIS2.

Next, at step 405, the adapter 5 sets a first timer, and then, at step 406, the adapter 5 determines whether or not a DIS1 from the facsimile machine 4 is received. The operation at step 406 is repeated by step 407 until the value of the first timer reaches a first predetermined value. As a result, as shown in FIG. 5, if a DIS1 is received by the adapter 5 before the value of the first timer reaches the first predetermined value, the control proceeds to step 415, which generates a DTC signal and transmits it to the facsimile machine 4. Thus, thereafter, in the same way as in FIG. 2, a polling transmission from the facsimile machine 4 to the facsimile machine 1, is carried out.

On the other hand, if a DIS1 is not received by the adapter 5 until the value of the first timer reaches the first predetermined value, the control proceeds to step 408, which passes the DIS2 therethrough. As a result, the communication enters in an NG state, since the facsimile machine 4 has received a DIS2.

Steps 409 through 415 are explained next with reference to FIG. 6.

At step 409, the adapter 5 does not pass the DIS1, so that the adapter 2, i.e., the facsimile machine 1 does not receive any DIS1.

Next, at step 410, the adapter 5 sets a second timer, and then, at step 411, the adapter 5 determines whether or not a DIS2 from the facsimile machine 1 is received. The operation at step 411 is repeated by step 412 until the value of the second timer reaches a second predetermined value. As a result, as shown in FIG. 6, if a DIS2 is received by the adapter 5 before the value of the second timer reaches the second predetermined value, the control proceeds to step 415, which generates a DTC signal and transmits it to the facsimile machine 4. Thus, thereafter, in the same way as in FIG. 2, a polling transmission from the facsimile machine 4 to the facsimile machine 1 is carried out.

On the other hand, if a DIS2 is not received by the adapter 5 until the value of the second timer reaches the second predetermined value, the control proceeds to step 413, which passes the DIS1 therethrough. Further, at step 414, the adapter 5 passes a DTC from the facsimile machine 1 to the facsimile machine 4. As a result, the communication enters in an NG state, since the facsimile machine 4 has received this DIS1.

Thus, even if the facsimile machine 1 does not have a polling function, polling data can be transmitted from the facsimile machine 4 to the facsimile machine 1.

In the above-described embodiment, each of the predetermined values corresponds to about 3 sec, in consideration of the number of repetitions of DISs before the communication enters in an NG state and without affecting non-polling communication.

Also, the present invention can be applied to any facsimile systems each including at least one polling function facsimile machine and one non-polling function facsimile machine, and in this case, the function as shown in FIG. 4 is incorporated into an adapter connected to the polling function facsimile machine. For example, the present invention can be applied to a facsimile system of FIG. 1A where the facsimile machine 1 has a polling function and the facsimile machine 4 does not have a polling function. In this case, the function as shown in FIG. 4 is incorporated into the adapter 2; however, the function as shown in FIG. 4 can be incorporated into the adapter 5.

Further, in the above-described embodiment, communication between the adapters 2 and 5 can be carried out by protocols other than the ARQ protocol.

As explained hereinabove, according to the present invention, since a special function is introduced into an adapter connected to a facsimile machine having a polling function, a polling communication can be carried out between this facsimile machine and another facsimile machine having no polling function. This can decrease the manufacturing cost of the latter facsimile machine.

What is claimed is:

1. A facsimile adapter operatively connected to a first facsimile machine having a polling function and being capable of communicating with a second facsimile machine having no polling function, comprising:

means for determining whether or not a first digital identification signal showing presence of data to be transmitted from said first facsimile machine is received;

means for determining whether or not a second digital identification signal showing absence of data to be transmitted from said second facsimile machine is received;

means for stopping transfer of said first digital identification signal for a first predetermined time period after said first digital identification signal is first received;

means for determining whether or not said second digital identification signal from said second facsimile machine is received for said first predetermined time period;

means for generating a first digital transmit command signal and transmitting said first digital transmit command signal to said first facsimile machine, so that a polling communication is carried out from said first facsimile machine to said second facsimile machine, when said second digital identification signal is received during said first predetermined time period;

means for passing said first digital identification signal to said second facsimile machine, when said second digital identification signal has not been received during said first predetermined time period;

means for stopping transfer of said second digital identification signal for a second predetermined time period after said second digital identification signal is first received;

means for determining whether or not said first digital identification signal from said first facsimile machine is received for said second predetermined time period;

means for generating a second digital transmit command signal and transmitting said second digital transmit command signal to said first facsimile machine, so that a polling communication is carried out from said first facsimile machine to said second facsimile machine, when said first digital identification signal is received during said second predetermined time period; and means for passing said second digital identification signal to said first facsimile machine, when said first digital identification signal has not been received during said second predetermined time period.

2. The facsimile adapter as set forth in claim 1, being connected by a switching system to said first facsimile machine, said second facsimile machine being connected to a mobile station.

3. The facsimile adapter as set forth in claim 1, wherein each of said first and second predetermined time periods is about 3 sec.

4. A facsimile communication method for carrying out polling data communication from a first facsimile machine having a polling function and a second facsimile machine having no polling function, comprising the steps of:

determining whether or not a first digital identification signal showing presence of data to be transmitted from said first facsimile machine is received;

determining whether or not a second digital identification signal showing absence of data to be transmitted from said second facsimile machine is received;

stopping transfer of said first digital identification signal for a first predetermined time period after said first digital identification signal is first received;

determining whether or not said second digital identification signal from said second facsimile machine is received for said first predetermined time period;

generating a first digital transmit command signal and transmitting said first digital transmit command signal to said first facsimile machine, so that a polling communication is carried out from said first facsimile machine to said second facsimile machine, when said second digital identification signal is received during said first predetermined time period;

passing said first digital identification signal to said second facsimile machine, when said second digital identification signal has not been received during said first predetermined time period;

stopping transfer of said second digital identification signal for a second predetermined time period after said second digital identification signal is first received;

determining whether or not said first digital identification signal from said first facsimile machine is received for said second predetermined time period;

generating a second digital transmit command signal and transmitting said second digital transmit command signal to said first facsimile machine, so that a polling communication is carried out from said first facsimile machine to said second facsimile machine, when said first digital identification signal is received during said second predetermined time period; and passing said second digital identification signal to said first facsimile machine, when said first digital identification signal has not been received during said second predetermined time period.

5. The method adapter as set forth in claim 4, wherein said first facsimile machine is fixedly connected to a switching system, said second facsimile machine being connected to a mobile station.

6. The facsimile adapter as set forth in claim 4, wherein each of said first and second predetermined time periods is about 3 sec.

7. A facsimile communication system including a first adapter connected to a first facsimile machine having a polling function and a second adapter connected to a second facsimile machine, wherein, only when said first adapter receives digital identification signals from both of said first and second facsimile machines within a predetermined time period, does said first adapter generate a digital transmit signal and transmit it to said first facsimile machine so that a polling communication is carried out from said first facsimile machine to said second facsimile machine, wherein, when the first adapter receives a first digital identification signal from the second facsimile machine indicating that the second facsimile machine is a non-polling facsimile machine, the first adapter temporarily holds the first digital identification signal without sending it to the first facsimile machine.

8. The facsimile communication system as set forth in claim 7, wherein, when the first adapter receives the first digital identification signal from the second facsimile machine and when the first adapter does not receive a second digital identification signal from the first facsimile machine within the predetermined time period, the first adapter does not generate the digital transmit signal and instead passes the first digital identification signal to the first facsimile machine.

* * * * *